(12) United States Patent　　(10) Patent No.: US 7,561,763 B2
Kiani et al.　　(45) Date of Patent: Jul. 14, 2009

(54) CONNECTOR SYSTEM FOR OPTICAL WAVE GUIDES

(75) Inventors: Sepehr Kiani, Watertown, MA (US); John A. Lehman, Bedford, NH (US)

(73) Assignee: Amphenol Corporation, Wallingford, CT (US)

( * ) Notice: Subject to any disclaimer, the term of this patent is extended or adjusted under 35 U.S.C. 154(b) by 16 days.

(21) Appl. No.: 11/785,627

(22) Filed: Apr. 19, 2007

(65) Prior Publication Data

US 2007/0286555 A1　Dec. 13, 2007

(51) Int. Cl.
*G02B 6/00*　(2006.01)
*G02B 6/30*　(2006.01)
*G02B 6/36*　(2006.01)

(52) U.S. Cl. .............. 385/14; 385/49; 385/53; 385/58; 385/76; 385/88; 385/92

(58) Field of Classification Search ........... 385/14
See application file for complete search history.

(56) References Cited

U.S. PATENT DOCUMENTS

| 6,461,053 | B1 * | 10/2002 | Mayercik et al. ............ 385/56 |
| 6,511,229 | B2 | 1/2003 | Kiani |
| 6,516,105 | B1 | 2/2003 | Khusid et al. |
| 6,520,686 | B1 | 2/2003 | Kiani |
| 6,547,444 | B2 | 4/2003 | Kiani |
| 6,547,445 | B2 | 4/2003 | Kiani |
| 6,616,342 | B2 | 9/2003 | Kiani |
| 6,762,941 | B2 | 7/2004 | Roth |
| 6,769,814 | B2 | 8/2004 | Kiani |
| 7,033,084 | B2 | 4/2006 | Lappohn |
| 7,213,974 | B2 * | 5/2007 | Kiani et al. .................. 385/58 |
| 2002/0150342 | A1 | 10/2002 | Kiani |
| 2003/0044127 | A1 | 3/2003 | Roth et al. |
| 2005/0135742 | A1 | 6/2005 | Basavanhally et al. |

FOREIGN PATENT DOCUMENTS

| EP | 1 336 880 A2 | 8/2003 |
| JP | 60156021 | 8/1985 |
| JP | 01302210 | 6/1989 |
| WO | WO 02/061481 | 8/2002 |
| WO | WO 03/021322 | 3/2003 |

* cited by examiner

*Primary Examiner*—Frank G Font
*Assistant Examiner*—Mary A El Shammaa
(74) *Attorney, Agent, or Firm*—Blank Rome LLP

(57) ABSTRACT

An optical connector system joining waveguides in two printed circuit boards. A flexible optical conductor is connected at one end to one of the boards. The flexible conductor includes at its free end an alignment structure that provides a separable, low loss interface to an alignment structure coupled to the waveguide on the other board. The ends of the waveguides are enclosed in housings that protect the waveguides from abrasion and contaminates, but expose the waveguides when the connectors mate.

25 Claims, 8 Drawing Sheets

CONNECTOR SYSTEM FOR OPTICAL WAVE GUIDES

FIELD OF INVENTION

This invention relates generally to electronic systems and more particularly to electronic systems in which signals are transmitted optically.

BACKGROUND

Complicated electronic systems are often constructed using multiple sub-assemblies. Often, electronic circuits are built on printed circuit boards. Each printed circuit board might contain circuitry that performs a specific function. For example, one circuit board in an electronic system might contain a processor and supporting circuitry while another circuit board might contain memory. Providing subassemblies that contain specific functions allows significant flexibility in assembling or servicing an electronic system because the circuitry for a specific function can be removed, added or replaced.

Often, electrical connections between the circuit boards are made through a backplane. An electrical backplane is a printed circuit board predominantly containing traces that carry electronic signals. The circuit boards implementing specific functions are often called "daughter cards." Connectors are mounted on the backplane and make electrical connection to the traces. Complimentary connectors are mounted on the daughter cards.

The backplane is often mounted in a card cage or other support structure. To assemble a system, daughter cards are inserted into the card cage such that the electrical connectors on the daughter cards mate with the electrical connectors on the backplane. In operation, electrical signals pass from one daughter card to another through the backplane.

As electronic systems have become more sophisticated, there has been a need to pass more data between daughter cards. To handle higher data rates, some electronic systems employ light signals to transmit data. The light is routed from circuit component to circuit component using optical wave guides. The optical wave guides are often in the form of fiber.

When optical fiber is used to route signals within an electronic assembly, it is desirable to maintain the modular architecture of the electronic system. It would, for example, be desirable to manufacture the system as separate modules resembling conventional printed circuit boards. To retain that architecture with optical connections, blind mate optical connectors are required.

Blind mate connectors are constructed to mate when pressed together. They can mate without the need for physical access to the connector. Blind mate connectors are particularly well suited for use in a daughter card/backplane configuration because the backplane is generally not easily accessible from the outside of the card cage housing the electronic system. Inserting a daughter card into the card cage provides the force needed to mate the blind mate connectors. Blind mate electrical connectors have been widely used for many years. Teradyne Connection Systems of Nashua, N.H. sells blind mate optical connectors under the name HD Optyx™. These optical connectors are well suited for use with optical wave guides in the form of fiber that is physically separate from the daughter card and backplane board structures.

However, there is a desire to create optical interconnections within electronic systems by forming wave guides integrated within printed circuit boards. Such an architecture facilitates the use of electrical and optical signals within the same electronic system and increases the level of integration while reducing the number of optical fiber bundles running within a card cage enclosure. It has been proposed to embed optical fibers in the epoxy or other matrix material that provides structure to a printed circuit board. Other approaches for making optical wave guides as part of a printed circuit board assembly have also been explored. For example, optical wave guides might be formed by depositing transparent polymer in traces within the matrix.

While integrating the wave guide into the printed circuit board provides many advantages, there is currently a need for connectors that would allow optical signals to be routed from board to board. There is also a need for such connectors that would operate in a blind mate configuration.

SUMMARY OF INVENTION

The invention relates to an improved optical connections.

In one aspect, the invention relates to an optical connector adapted for mounting to a printed circuit board having an optical waveguide formed therein. The optical waveguide has an end exposed through a surface of the printed circuit board. The connector has an alignment body with a first face adapted for mounting against the surface of the printed circuit board. The alignment assembly includes an aperture adapted to receive a ferrule. The connector also includes a housing having a cavity and a second face, the second face having an opening into the cavity. The housing has a shutter assembly with a movable shutter, the shutter being movable between at least a first position in which the shutter covers the opening into the cavity and a second position exposing the opening, wherein the aperture adapted to receive the ferrule is disposed within the cavity.

Such a connector might be used in various configurations, such as on a daughter card or a backplane.

In another aspect, the invention relates to an assembly including an optical connector adapted for mating with a second optical connector. The assembly comprises a substrate with an optical waveguide formed therein. The optical waveguide has an end exposed through a surface of the substrate. An alignment structure provides a first face and a second face. An optical conductor has a first end and a second end, the first end exposed through the first face of the alignment structure and the second end exposed through the second face of the alignment structure. An alignment feature is rigidly coupled to the surface of the substrate and engages the alignment structure whereby the first face of the alignment structure is positioned adjacent the surface of the substrate with the end of the optical waveguide in the substrate aligned with the first end of the optical conductor.

In another aspect, the invention relates to an assembly that includes a first planar substrate having a first optical waveguide formed therein, the first optical waveguide disposed in the plane of the first planar substrate. The assembly also includes a second planar substrate having a second optical waveguide formed therein, the waveguide disposed in the plane of the second planar substrate. A flexible optical waveguide has a first end coupled to the first planar substrate and a second end. A first alignment structure is attached to the second end of the flexible optical waveguide. A second alignment structure is attached to the second planar substrate, the second alignment structure configured to engage the first alignment structure to thereby form a separable optical interface.

DESCRIPTION OF THE PREFERRED EMBODIMENT

Figure 1:
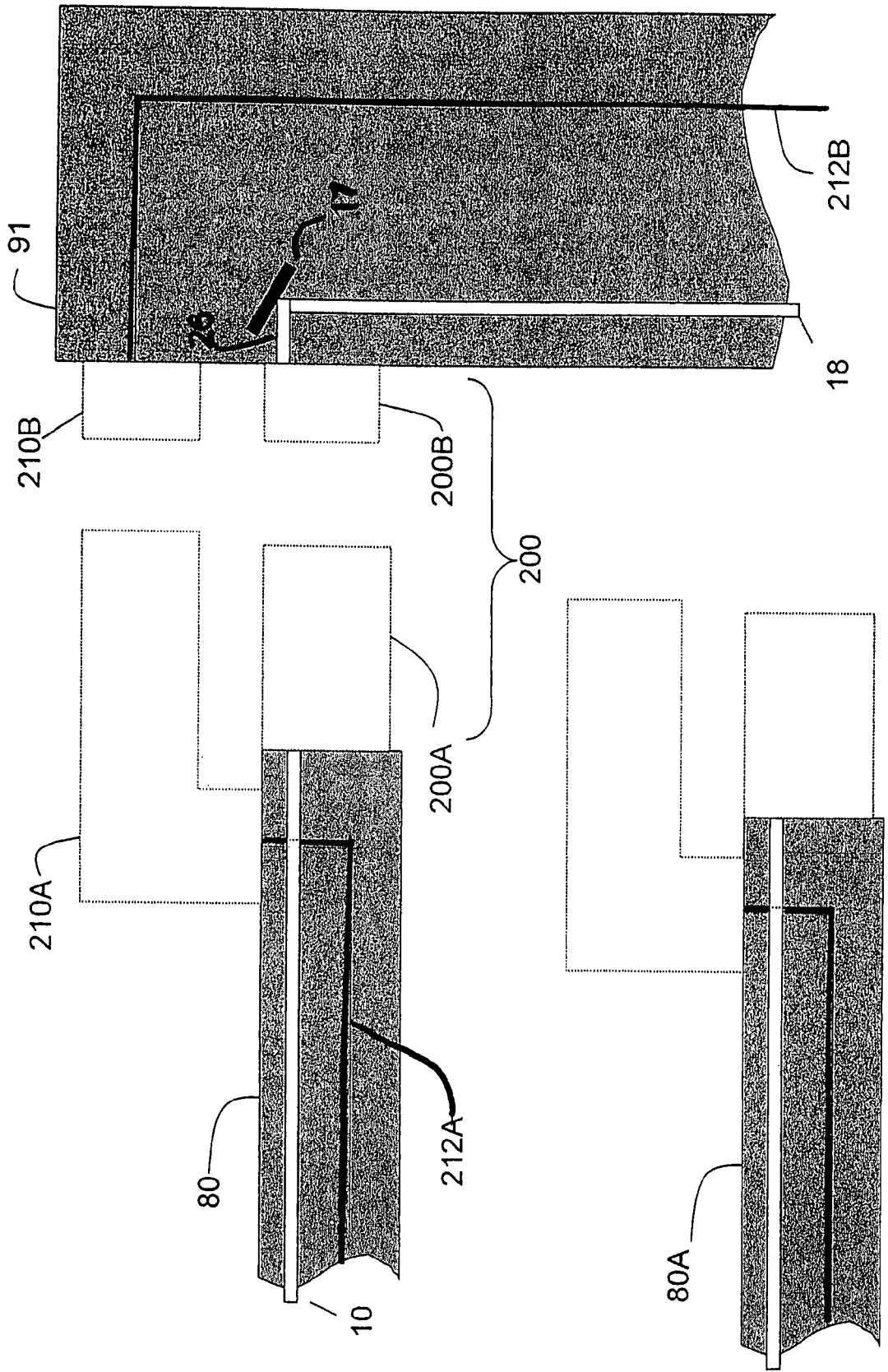
FIG. 1 is a schematic illustration of a portion of an electronic system.

FIG. 1 illustrates in schematic form a portion of an electronic system. A portion of a backplane 91 is shown. FIG. 1 also shows a portion of a daughter card 80. A complex electronic system would likely contain multiple daughter cards, aligned in parallel, but a single additional daughter card 80A is shown for simplicity. An electronic system would also likely contain a card cage or other mechanical support as a mechanism to align the daughter cards with the backplane and to generate the force required to mate the daughter card connectors with connectors on the backplane. A conventional card cage and other conventional components might be used in conjunction with the portion of the system shown, but such features are omitted from the drawings for simplicity.

Conductive traces such as trace 212B route electrical signals through backplane 91. Likewise, conductive traces such as 212A route electrical signals through daughter card 80. As in prior art electronic systems, a daughter card electrical connector 210A is mounted to daughter card 80. A mating backplane electrical connector 210B is mounted to backplane 91. Electrical traces such as 212A in daughter card 80 route electrical signals to daughter card connector 210A. Traces such as 212B are connected to backplane electrical connector 210B. When daughter card electrical connector 210A mates with backplane electrical connector 210B, circuit paths are provided from daughter card 80 into backplane 91. Preferably, daughter card electrical connector 210A and backplane electrical connector 210B form a blind mate electrical connector allowing daughter card 80 to be electrically connected to backplane 91 easily when it is inserted into the electronic system.

The electronic system shown in FIG. 1 also employs optical wave guides for routing optical signals. Daughter card 80 includes a wave guide 10. Backplane 91 includes a wave guide 18 and 26. In the illustrated embodiment, wave guide 18 runs along the length of backplane 91, transverse to other daughter cards connected to backplane 91, such as daughter card 80A. Because light signals running within wave guide 18 are directional, a means is employed to direct light signals within wave guide 18 towards one of the daughter cards such as 80 or 80A. In FIG. 1, a mirror 17 is shown directing light traveling through wave guide 18 into wave guide 26, which has an axis directed towards daughter card 80. Light traveling from daughter card 80 takes a reverse path through wave guide 26 to mirror 17 where it is reflected into wave guide 18 which can carry the light signal to other daughter cards in the electronic system.

FIG. 1 shows the means of deflecting light is a mirror 17 incorporated into backplane 91. However, other means might be used. Other reflective surfaces might be used. For example, an angled element such as is shown in U.S. Pat. No. 6,516,105 to Khusid, et al. entitled Optical Backplane Assembly and Method of Making Same (which is hereby incorporated by reference in its entirety) might be used.

Though wave guide 26 is directed toward daughter card 80, it is desirable to use an optical connector 200 to create a reliable and repeatable separable interface for the coupling of light signals between backplane 91 and daughter card 80. The electronic system of FIG. 1 includes an optical connector 200. In the preferred embodiment, optical connector 200 is also a blind mate connector. Here, the connector is shown to have two pieces. Daughter card connector 200A is mounted to daughter card 80 and makes an optical connection to wave guide 10. Backplane connector 200B is attached to backplane 91 and makes an optical connection to wave guide 26. When daughter card 80 is inserted into the electronic system, daughter card connector 200A mates to backplane connector 200B creating an optical signal path between wave guide 10 and wave guide 26. Other connectors (not shown) mounted on backplane 91 couple light to other daughter cards in the system.

Figure 2:
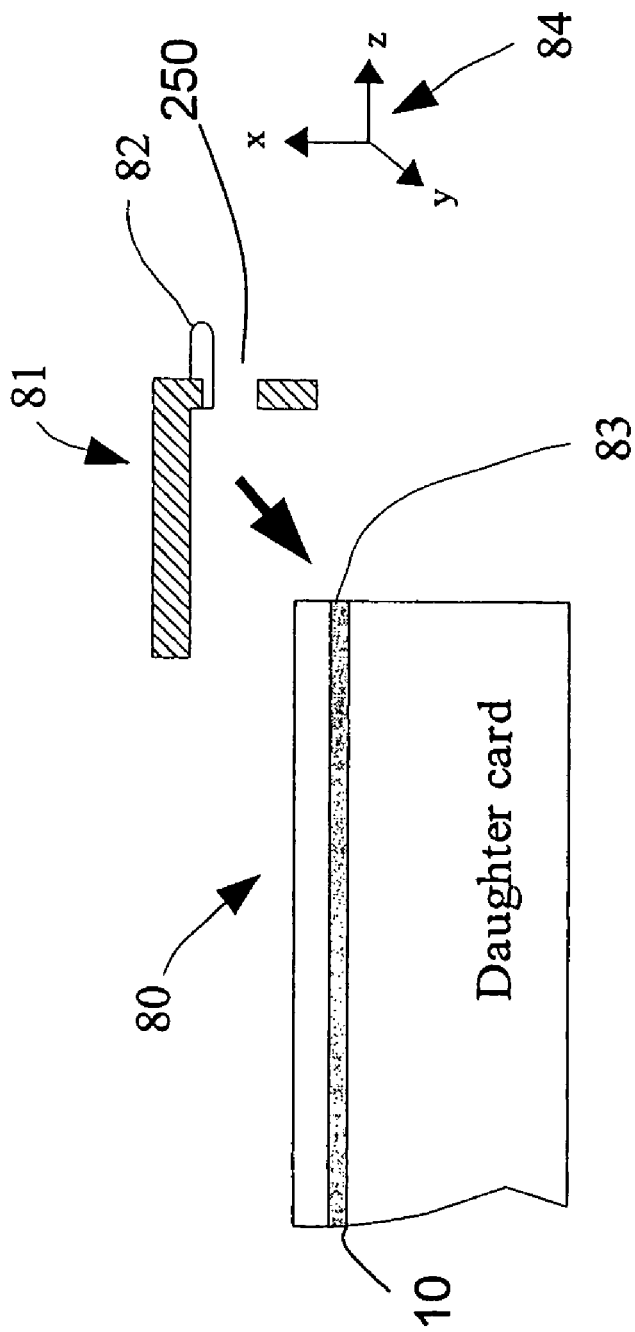
FIG. 2 is a sketch showing one step in the assembly of an optical connector.

FIG. 2 shows steps in the process by which optical connector 200A is attached to daughter card 80. In the illustrated embodiment, an alignment body is attached to daughter card 80 to facilitate alignment of an optical signal carrying member with wave guide 10, which in the embodiment of FIG. 2 extends from a forward edge of daughter card 80. Preferably alignment body 81 is attached to daughter card 80 with a known position relative to the exposed end 83 of wave guide 10.

Various methods might be used to affix alignment body 81 in the desired position. For example, the exposed end 83 of wave guide 10 might be located using a computer vision system. That same vision system or another calibrated vision system might then be used in positioning alignment body relative to the end 83 of wave guide 10. As an alternative, daughter card 80 might be constructed with a reference feature, such as a hole, slot or projection with a known orientation relative to wave guide 10. Alignment body 81 might then be positioned relative to the alignment feature built into daughter card 80. For example, alignment body 81 might include a complimentary alignment feature that could engage the alignment feature on daughter card 80 to appropriately position alignment body 81.

Alignment body 81 includes an opening 250 that allows access to the end 83 of wave guide 10 after alignment body 81 is affixed to daughter card 80. In the illustrated embodiment, alignment feature 82 is attached to alignment body 81. When alignment body 81 is secured in the proper position relative to the end 83 of wave guide 10, alignment feature 82 will have a known position relative to the end 83 of wave guide 10.

Alignment body 81 may be attached to daughter card 80 in any convenient means. For example, glue, solder, or mechanical fastening might be used to secure alignment body 81 to daughter card 80. It is not, however, necessary that alignment body 81 be made as a separate component from daughter card 80. Where a daughter card can be manufactured with sufficient precision, features of alignment body 81 might be incorporated in the manufacture of daughter card 80. For example, a hole or multiple holes might be drilled in daughter card 80 in a precise position relative to face 83 of wave guide 10. An alignment feature such as post 82 might then be inserted in such a hole. Regardless of the precise method of manufacture, a daughter card assembly will preferably include alignment features that identify the face 83 of wave guide 10 in the directions denoted x and y in legend 84.

Figure 3:
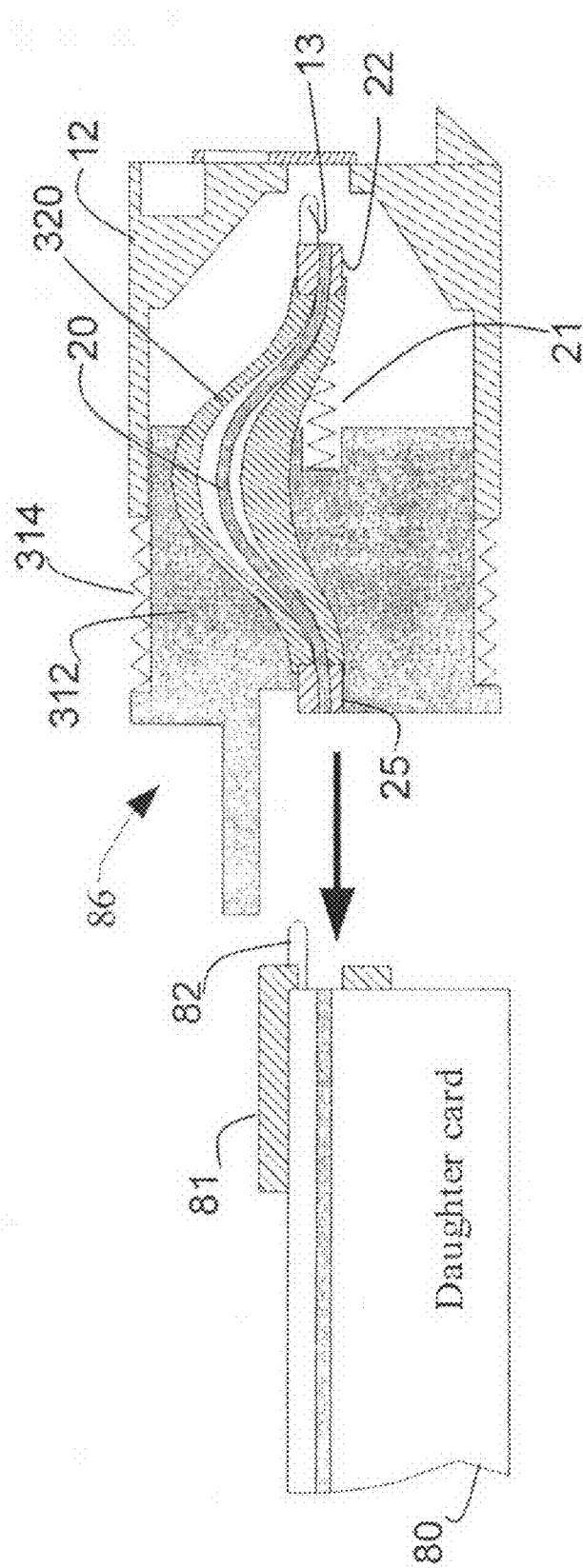
FIG. 3 is a sketch showing a later step in the manufacture of an optical connector.

FIG. 3 shows a subsequent step in the assembly process. In this view, alignment body 81 is attached to daughter card 80. Connector body 86 is then attached to the daughter card assembly.

Connector body 86 includes a rear housing 312 and a forward housing 12. Preferably the rear housing 312 and the forward housing 12 slide relative to each other. This sliding motion adjusts for any misalignment between the daughter card 80 and the backplane 91 in the direction identified as z in the legend 84 (FIG. 2). In the illustrated embodiment, rear housing 312 is fixed to daughter card 80 and forward housing 12 slides relative to rear housing 312. A bias mechanism is included to normally bias forward housing 12 forward. In the illustrated embodiment, springs 314, are incorporated between the rear housing 312 and the forward housing 12 to provide the forward bias of front housing 12.

An optical conductor 20 is enclosed within the housings 12 and 312. In the illustrated embodiment, optical conductor 20 may be an optical fiber. In the illustrated embodiment, optical fiber 20 is enclosed in a protective sheath 320. Protective sheath 320 is preferably constructed from a flexible material such as plastic.

Preferably, optical conductor 20 is terminated at each end with an alignment structure. The alignment structures aid in positioning the ends of optical conductor 20 relative to the wave guides in the daughter card and the backplane. Ferrules are known alignment structures for optical fibers and might be used.

In the embodiment illustrated in FIG. 3, one end of optical connector 20 is terminated in a ferrule 25 which serves as an alignment member. Ferrule 25 may be, for example, a cylindrical ferrule or an MT ferrule such as are used in prior art optical connectors, but other types of ferrules might be used as well. Preferably, ferrule 25 is attached to optical conductor 20 and then cleaned and polished as is known in the art.

Ferrule 25 is mounted to rear housing 312 such that when rear housing 312 is attached to daughter card 80, ferrule 25 will have a precisely controlled position relative to the end of wave guide 10 and daughter card 80. Various mounting methods may be used to achieve this result. For example, rear housing 312 might include an alignment feature that engages with alignment feature 82. In such an embodiment, rear housing 312 would be constructed to hold ferrule 25 in a precise positional relationship relative to the alignment feature in rear housing 312. In this way, when alignment feature 82 engages a complimentary alignment feature in rear housing 312, ferrule 25 is positioned relative to the end of wave guide 10.

Alternatively, ferrule 25 might be mounted within rear housing 312 with compliance. Alignment feature 82 might engage a complimentary alignment feature in ferrule 25. For example, it is known to make ferrules with holes to receive posts for alignment. In such an embodiment, alignment body 81 might serve only to coarsely position rear housing 312 relative to the end of wave guide 10. Fine alignment between optical conductor 20 and wave guide 10 would be provided when ferrule 25 was positioned by alignment feature 82.

Because the connection between optical conductor 20 and wave guide 10 is, in normal system operation, not separated, index matching gel can be used at the interface between wave guide 10 and optical conductor 20 to reduce loss and back reflection at that interface. While the forward edge of daughter card 80 could be polished to form a low loss interface with ferrule 25, the use of index matching gel reduces the need for a precisely manufactured face on board 80. In this way, an interface with acceptable optical loss can be formed if ferrule 25 is adjacent waveguide 10 even if the two are not in direct physical contact.

The opposing end of optical conductor 20 is also preferably terminated with an alignment member. In the illustrated embodiment, ferrule 22 is attached to an end of optical conductor 20. Various sizes and shapes of ferrules are known for terminating optical fibers and might be used. In the illustrated embodiment, ferrule 22 includes an alignment feature. Here a post 13 is shown.

FIGS. 4A-4D show steps of the process of assembling a connector 200B to backplane 91 according to one embodiment. The face 93 of wave guide 26 is exposed on the surface of backplane 91. Alignment body 90 is affixed to backplane 91 with a precise position relative to face 93. As with the attachment of alignment body 81 to daughter card 80, the appropriate position of alignment body 90 relative to face 93 can be determined in multiple ways. For example, an optical inspection system can be used to locate face 93 of wave guide 26. An optical inspection system might then be used to position alignment body 90. Once appropriately positioned, alignment body 90 would then be secured to backplane 91 using any convenient attachment mechanism, such as with glue, solder or mechanical attachment mechanisms, such as screws, rivets or pins. Alternatively, backplane 91 might be constructed with alignment features at a precise position relative to face 93 that could engage complimentary features in alignment body 90. Also as described above, in connection with the mounting of the daughter card connector, where backplane 91 can be made with sufficient precision, alignment body 90 might be formed as a step in the manufacture of backplane 91 rather than attached as a separate operation.

Alignment body 90 includes one or more alignment features. Preferably, by positioning alignment body 90 relative to face 93 of wave guide 26, the alignment features of alignment body 90 will also have a precise position relative to face 93. In the illustrated embodiment, a post 92 is shown as an alignment feature on alignment body 90.

Figure 4A:
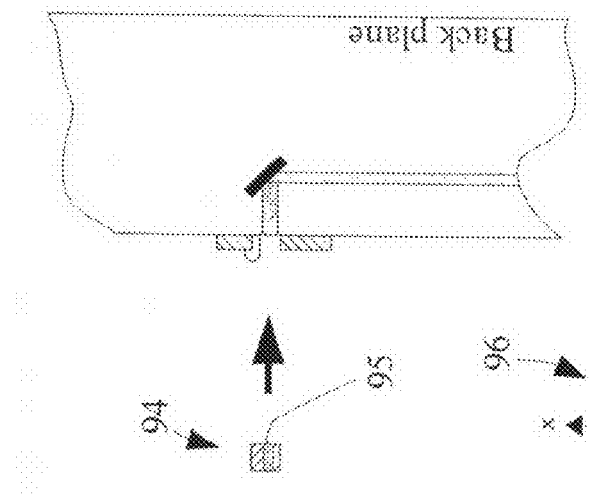
FIGS. 4A, 4B, 4C and 4D are sketches showing steps in the manufacture of an optical connector.
Figure 4B:
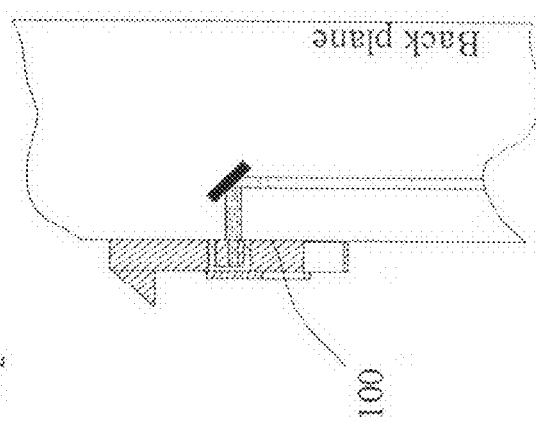

FIG. 4B shows that a ferrule 94 is inserted into alignment body 90. Ferrule 94 includes a wave guide stub 95. In the illustrated embodiment, ferrule 94 is aligned by alignment feature such as post 92. This alignment ensures that wave guide stub 95 aligns with wave guide 26.

In the illustrated embodiment, ferrule 94 is not separated from backplane assembly 91 during normal operation of the electronic system. Therefore, it is desirable to use index matching gel to reduce the optical loss and back reflection at the interface between wave guide stub 95 and wave guide 26. Ferrule 94 may be secured to either backplane 91 or alignment body 90 by any convenient means.

Figure 4C:
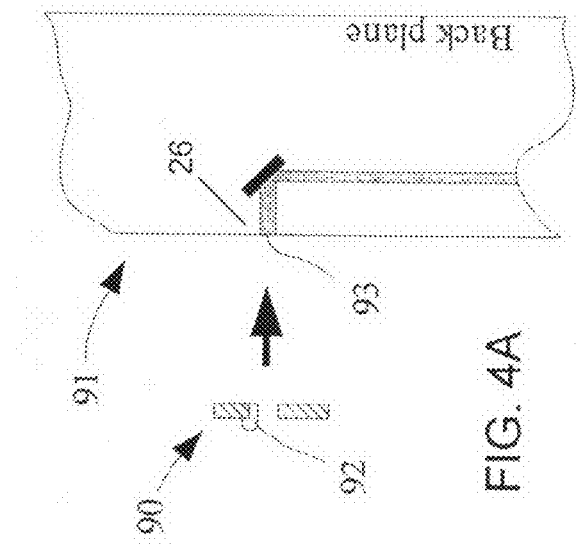

FIG. 4C shows that a shutter assembly 97 is next mounted to backplane 91. Shutter assembly 97 may be made of plastic, metal or other convenient material. Shutter assembly 97 includes a shutter member 98. Shutter member 98 protects the exposed face of the wave guide in the connector when no daughter card connector is mated to it. Shutter member 98 prevents dirt or abrasive materials from reaching the mating face of the waveguide. However, shutter member 98 is retractable so that the face of the waveguide may be exposed for mating to another connector.

In the illustrated embodiment, shutter 98 is mounted in shutter assembly 97 such that shutter 98 slides. Preferably, shutter 98 is biased, such as with a spring (not shown), to normally cover the mating face of fiber stub 95 within ferrule 94. In operation, shutter 98 may slide to expose face 99 as shown more fully in connection with FIGS. 5A-5D, below. Various alternative shutter assemblies might be used. For example, swinging or telescoping doors might be used to create a shutter assembly. Further examples are given in U.S. Pat. No. 6,511,229 entitled Methods and Apparatus for Controlling Access to an Optical Interface, which is hereby incorporated by reference in its entirety.

Figure 4D:
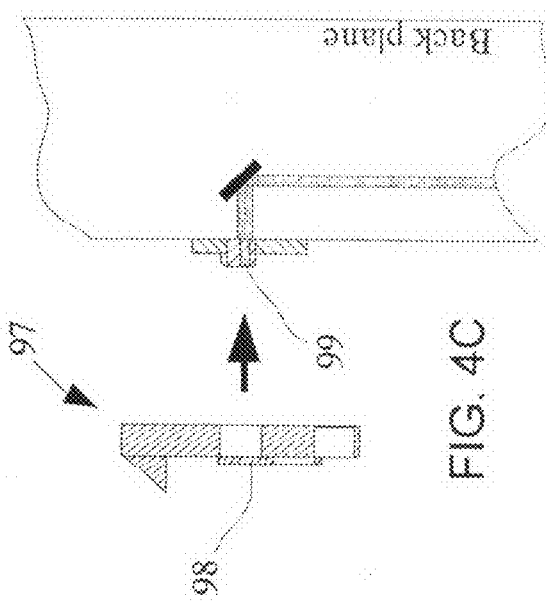

FIG. 4D shows shutter assembly 98 secured to backplane 91 along interface 100. Shutter 98 is shown in its normally biased position covering interface 99 of fiber stub 95. Daughter card connector 200A also includes a shutter member 14. Shutter member 14 is normally biased closed, covering the face of ferrule 22. Shutter 14 may be constructed similarly to the shutter member 98 in backplane connector 200B.

Figure 5A:
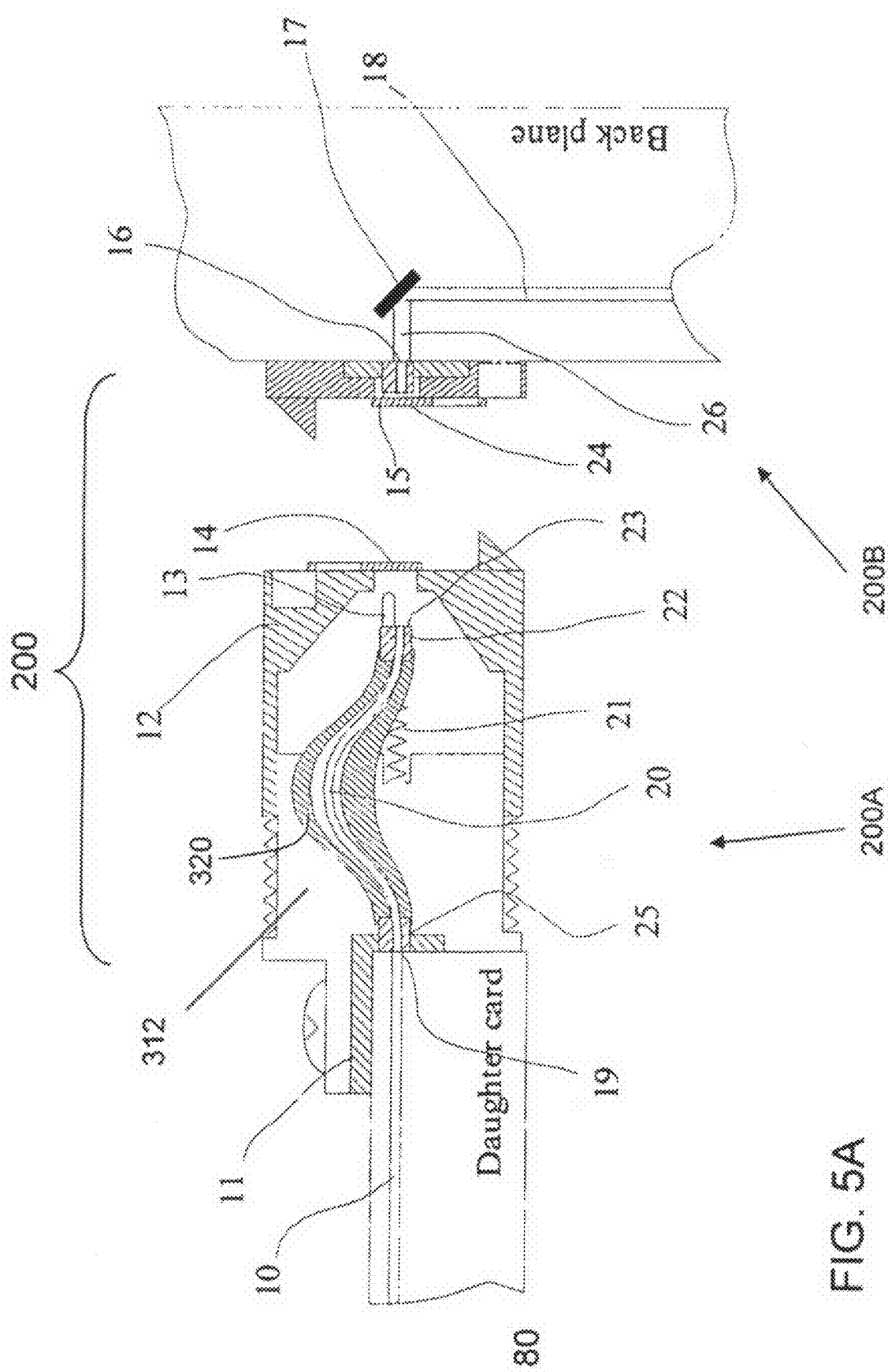
FIGS. 5A, 5B, 5C and 5D are sketches illustrating stages in the mating of an optical connector.

FIG. 5A shows the connector assembly 200 with connectors 200A and 200B positioned for mating. In this position, ferrule 25 is positioned to align one end of optical conductor 20 with wave guide 10. The opposing end of optical conductor 20 is mounted in ferrule 22. Ferrule 22 is held within front housing 12. Preferably, a compliant mounting is used to position ferrule 22 within connector body 86. In the embodiment illustrated in FIG. 5A, the compliant mounting is shown as a spring 21 connecting optical conductor 20 to rear housing 312. As will be described in greater detail below, compliant mounting of ferrule 22 allows the final position of ferrule 22 to be determined by alignment features on the ferrule rather than the position of the housing.

Figure 5B:
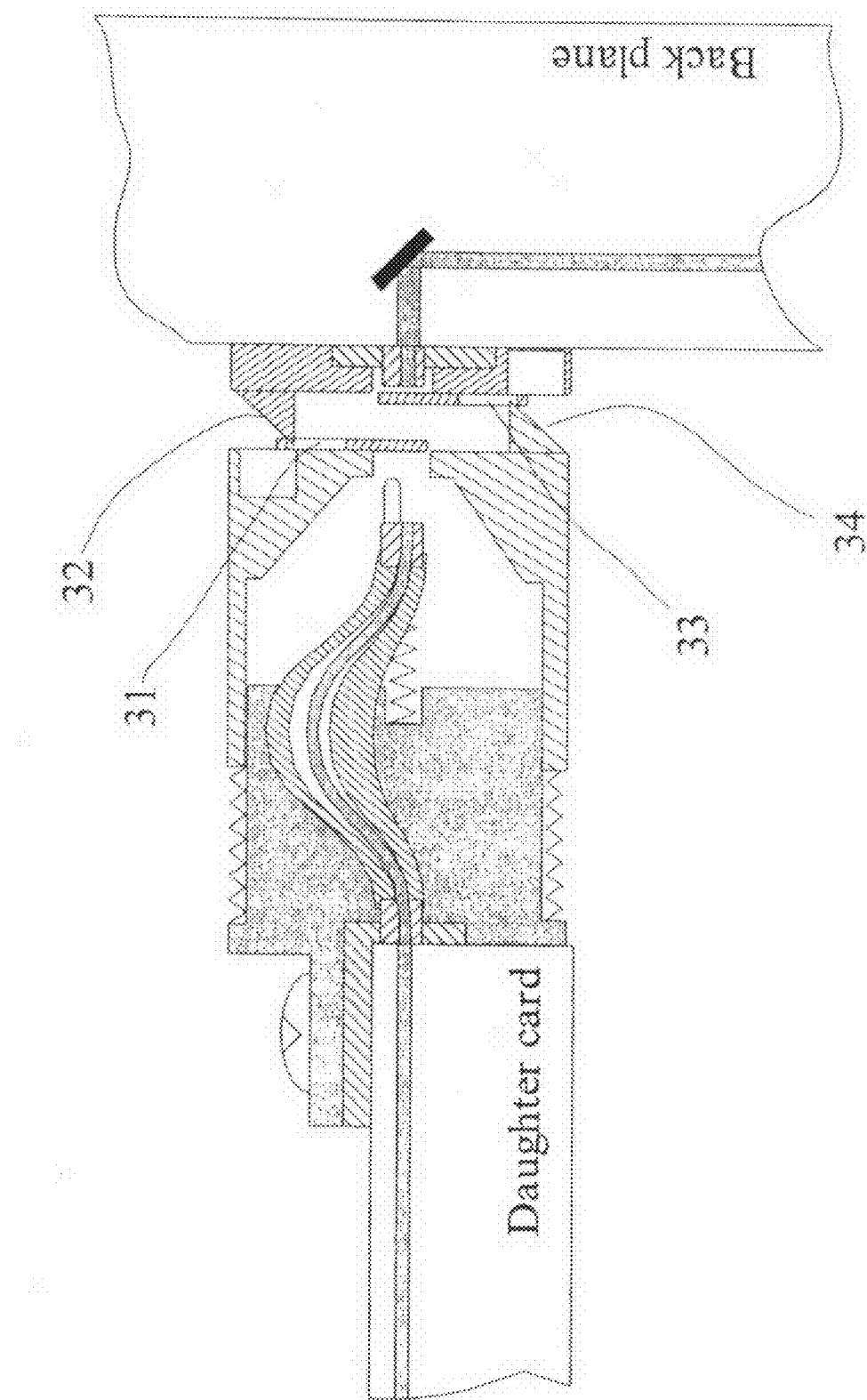

FIG. 5B shows the daughter card inserted into the electronic assembly to the point where daughter card connector 200A begins to engage backplane connector 200B. Backplane connector 200B includes a member to actuate shutter 14. Here, the shutter actuation member is a ramped projection 32. Daughter card connector 200A includes a similar ramped projection 34 to actuate shutter assembly 97.

Figure 5C:
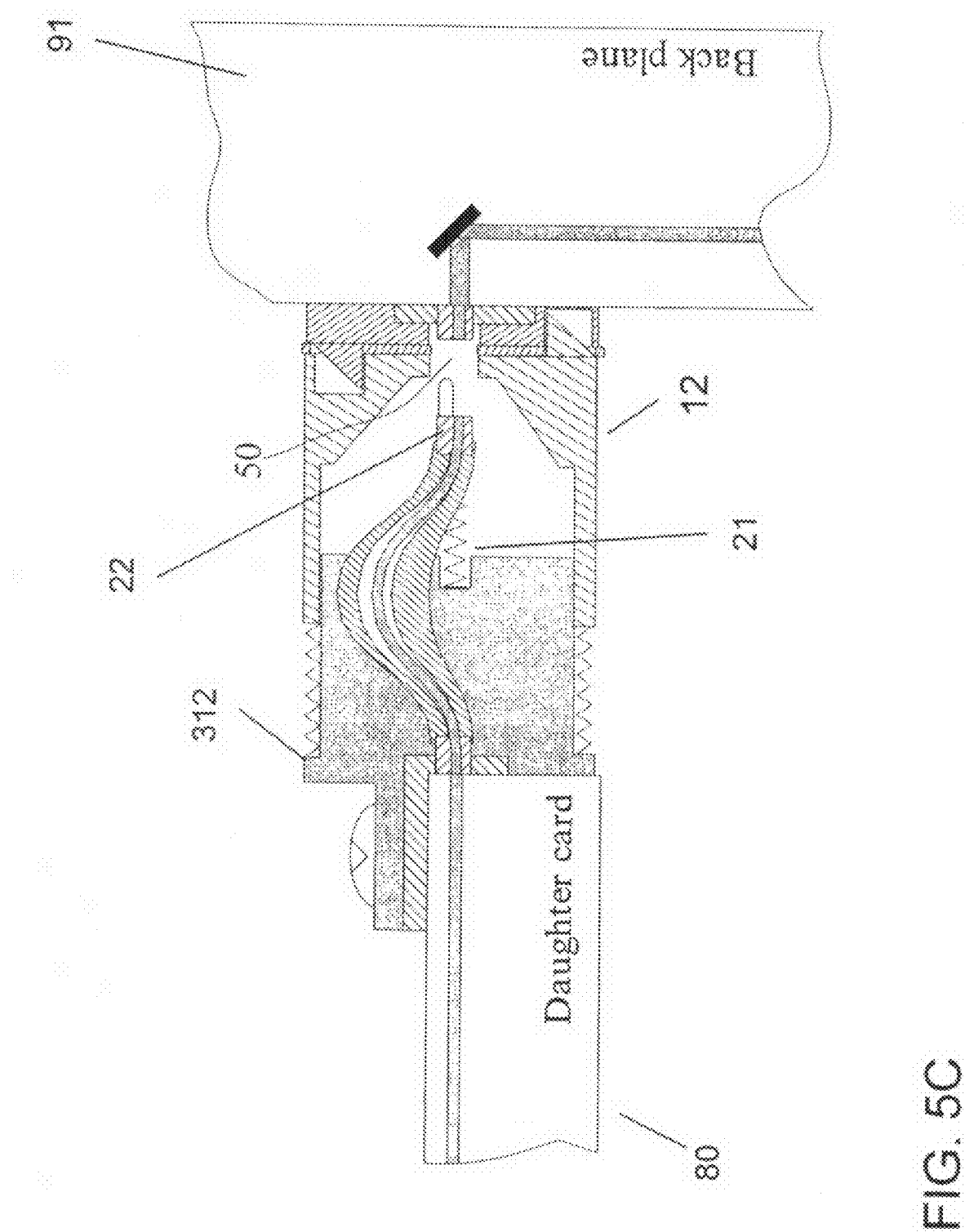
Figure 5D:
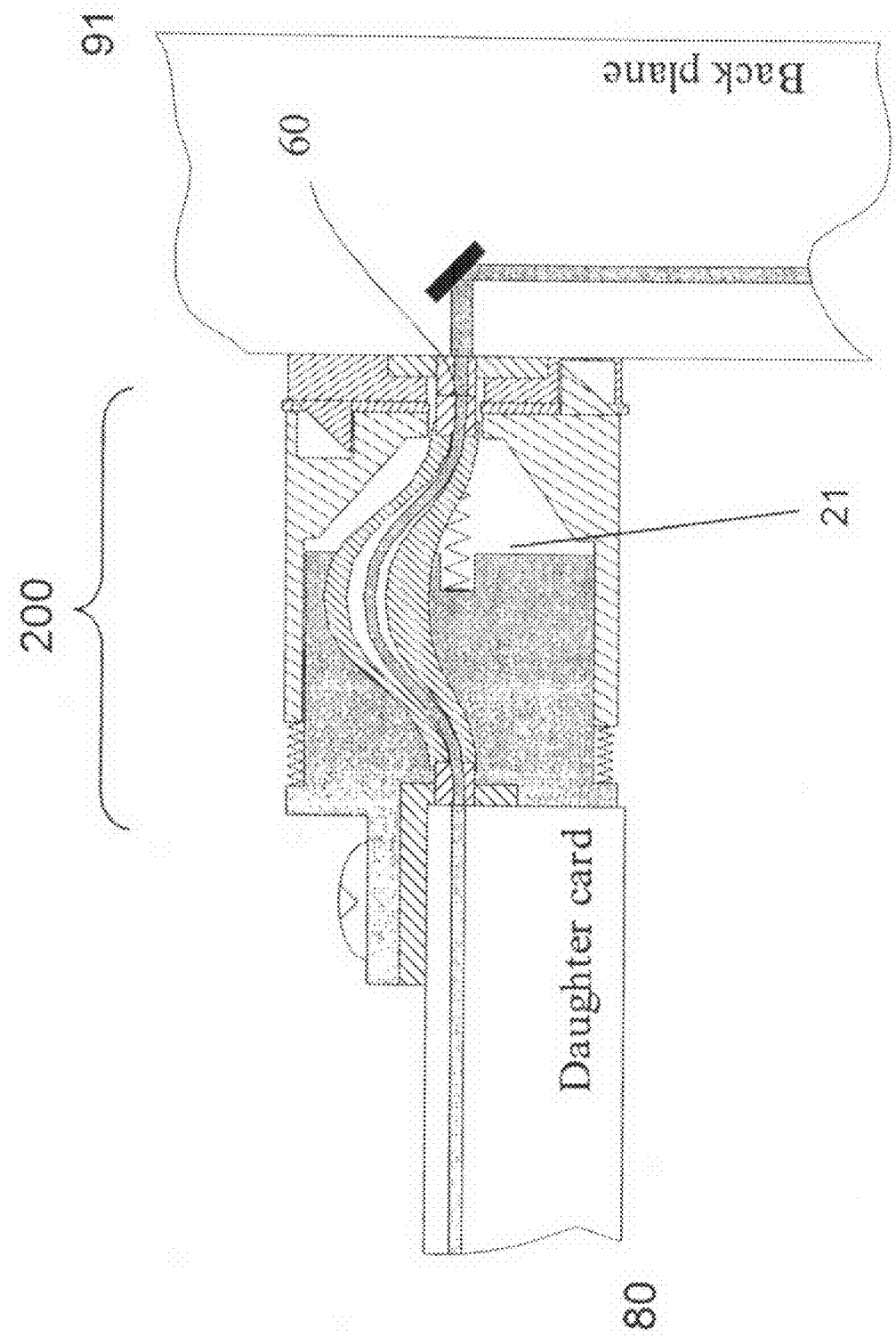

The shutter members of the daughter card connector and the backplane connector include features that engage a ramped projection of the opposing connector. In the illustrated embodiment, shutter member of the daughter card connector includes an opening 31 that engages ramped projection 32 from the backplane. Likewise the shutter member on the backplane connector includes an opening 33 that engages the ramped projection 34 from the daughter card connector. As daughter card 80 is inserted into the electronic assembly, ramped projections 32 and 34 act as wedges that drive back the shutter members in the opposing connector. FIG. 5C shows the daughter card inserted to the point that the shutter members on both the backplane and daughter card connectors have been retracted leaving an opening 50.

As daughter card 80 is pressed further towards backplane 91, front housing 12 retracts towards rear housing 312. As the front housing 12 retracts, ferrule 22 enters the opening 50 because it is preferably mounted in a compliant mount that biases it forward. In the illustration, spring 21 biases ferrule 22 forward while allowing some compliance. Protective sheath 320 is flexible to provide compliance. Preferably, sheath 320 is mounted in the connector housing with a hump or "pre-buckled" shape illustrated. As shown in FIG. 5A, the sheath 320 is pre-buckled before connectors 200A and 200B are pressed together. This pre-buckled shape is preferable because it facilitates compliant motion of ferrule 22 in the directions denoted x, y or z in FIG. 4. However, other compliant mountings might be used.

As daughter card 80 is pressed further forward, ferrule 22 engages with ferrule 94 from the backplane connector. Because of the compliant mounting including spring 21, the final position of ferrule 22 relative to ferrule 94 can be determined by alignment features coupled to the ferrules. In the illustrated embodiment, fine alignment between ferrules 22 and 94 is provided by alignment post 13 on ferrule 22 engaging a complimentary alignment feature on ferrule 94. In this way, ferrules 22 and 94 are aligned to provide a low loss interface between ferrule 22 and ferrule 94. Because interface 60 is intended to be a separable interface, index matching gel is preferably not used at interface 60.

The connector 200 advantageously provides a low loss optical path between wave guide 10 on daughter card 80 and a wave guide 18 within backplane 91.

Further, connector 200 is a blind mate connector, allowing a daughter card to be connected to a backplane even though the connector assembly is not readily accessible.

Having thus described several aspects of at least one embodiment of this invention, it is to be appreciated various alterations, modifications, and improvements will readily occur to those skilled in the art.

Various materials might be used to construct the connector described above. For example, ferrules or other structures intended to provide alignment of the optical conducting elements will preferably be made with materials that provide good dimensional stability. Many materials meet this requirement. For example, ceramic or precision machined metal might be used. Other components, such as front housing 12, that do not provide precise alignment can be made of less expensive materials. They might be made of plastic or, where conducting structures are desired to avoid EMI, might be die cast metal.

Also, the precise shapes shown are not essential to the invention. For example, the illustrated embodiment shows a mirror 17 within backplane 91 as a mechanism to redirect light traveling along backplane 91 towards a daughter card connected to the backplane. Such a mirrored element might be formed by laser cutting a slanted surface within backplane 91 and then coating the surface with a reflective coating. As an alternative, light might be redirected from a direction along the backplane 91 towards the daughter card 80 in other ways. Where the wave guide 18 is made of a flexible member, the member itself might be bent to redirect the light.

Alternatively, an angled element such as is shown in U.S. Pat. No. 6,516,105 might be inserted into a hole in backplane 91. Where an element is inserted into backplane 91, that element might also take the place of wave guide 26. Further, if the element inserted into backplane 91 extends past the surface of backplane 91, the extending portion might be terminated in a ferrule such as ferrule 94. Where that configuration is possible, the same element inserted into backplane 91 would also take the place of wave guide stub 95.

Further, the illustrated embodiment shows various portions of the design constructed from separate components. However, this construction is not required to obtain advantages of the invention. Various features shown as separate components can be combined in a single component. For example, alignment body 90 and ferrule 94 are shown to be manufactured as separate components. Where ferrule 94 can be mounted to backplane 91 with sufficient mechanical strength, alignment body 90 might be omitted. Alternatively, when alignment body 90 can be constructed to receive and terminate a fiber, ferrule 94 might be omitted.

As a further alternative, the illustrated embodiment shows the separable interface formed by ferrule 22 engaging a ferrule 94. If the surface of backplane 91 can be manufactured with sufficient precision, ferrule 94 might be omitted.

Further, the above-described embodiments use alignment features. Posts such as 82, 13 and 92 are used as an example of an alignment feature. Other shapes and sizes of alignment features are possible. For example, if ferrules 94 and 22 are cylindrical, a sleeve might be used as an alignment feature or, alignment might be provided by hemispherical members engaging grooves.

Also, the invention is not limited to any specific type of fiber or wave guide. In one contemplated embodiment, the wave guides and optical conductor 20 are single mode wave guides. However, embodiments incorporating multiple wave guides, such as fiber ribbons or planar wave guides are also contemplated.

Also, the invention has been described in connection with a portion of an electronic system, but can be employed with a full system. It is likely that a complex electronic system might use connectors joining multiple waveguides in each daughter card to multiple waveguides in a backplane. To make multiple connections, multiple connectors might be used. Alternatively, optical conductor 20 might include multiple fibers such that multiple connections might be made in all connectors.

Further, the described embodiment shows printed circuit boards for both the daughter cards and the backplane. Such a configuration allows optical and electrical signals to be carried on the same boards. However, it is not necessary that the daughter cards and the backplane be fabricated using printed circuit board technology or that they even include metal traces. While, the disclosed optical connectors are blind mate connectors and can be readily used in assemblies that use blind mate electrical connectors, their use is not so limited. The optical connectors might be used in systems without electrical connectors.

Also, the daughter card-backplane configuration illustrates one configuration in which the invention might be useful. Other configurations are possible Such alterations, modifications, and improvements are intended to be part of this disclosure, and are intended to be within the spirit and scope of the invention. Accordingly, the foregoing description and drawings are by way of example only.

What is claimed is:

1. An optical connector adapted for mounting to a printed circuit board having an optical waveguide formed therein, the optical waveguide having an end exposed through a surface of the printed circuit board, the connector comprising:
    a) an alignment body, the alignment body having a first face adapted for mounting against the surface of the printed circuit board, the alignment body including an aperture adapted to receive a ferrule;
    b) a housing having a cavity and a second face, the second face having an opening into the cavity, the housing having a shutter assembly with a movable shutter, the shutter being movable between at least a first position in which the shutter covers the opening into the cavity and a second position exposing the opening, wherein the aperture adapted to receive the ferrule is disposed within the cavity.

2. The optical connector of claim 1 wherein the printed circuit board is a backplane.

3. The optical connector of claim 1 wherein the printed circuit board is a daughter card having an edge and said surface of the printed circuit board is the edge.

4. The optical connector of claim 3 wherein the daughter card has a planar surface orthogonal to the edge and the alignment body has a second face, at right angles to the first face, adapted for attachment to the planar surface.

5. The optical connector of claim 1 additionally comprising an alignment assembly with at least a portion disposed within the aperture, the alignment assembly comprising:
    a) at least one ferrule providing at least a first mating surface and a second mating surface;
    b) an optical waveguide having a first end and a second end, the first end exposed through the first mating surface and the second end exposed through the second mating surface; and
    c) wherein at least one ferrule of the alignment assembly is positioned in the aperture with the first mating surface exposed in the first face of the housing.

6. The optical connector of claim 5 wherein the first mating surface and the second mating surface are on the same ferrule.

7. The optical connector of claim 5 wherein the at least one ferrule comprises a first ferrule and a second ferrule, with the first mating surface being on the first ferrule and the second mating surface being on the second ferrule, and the optical waveguide comprises an optical fiber.

8. The optical connector of claim 7 additionally comprising a compliant mounting coupling the second ferrule to the first ferrule.

9. The optical connector of claim 8 wherein the compliant mounting comprises a flexible sheath over the optical fiber.

10. The optical connector of claim 9 wherein the flexible sheath has a pre-buckled shape.

11. The optical connector of claim 8 wherein the compliant mounting comprises a spring biasing the second ferrule away from the alignment body.

12. The optical connector of claim 7 wherein the housing comprises a first housing portion and a second housing portion, slidably mounted relative to the first portion.

13. The optical connector of claim 12 comprising a bias member biasing the first housing portion and the second housing portion apart.

14. The optical connector of claim 12 wherein the first housing portion is fixedly mounted to the alignment member and the second housing portion comprises the shutter assembly.

15. An assembly including an optical connector adapted for mating with a second optical connector, the assembly comprising:
    a) a substrate having an optical waveguide formed therein, the optical waveguide having an end exposed through a surface of the substrate;
    b) an alignment structure providing a first face and a second face;
    c) an optical conductor having a first end and a second end, the first end exposed through the first face of the alignment structure and the second end exposed through the second face of the alignment structure;
    d) an alignment feature, rigidly coupled to the surface of the substrate and engaging the alignment structure whereby the first face of the alignment structure is positioned adjacent the surface of the substrate with the end of the optical waveguide in the substrate aligned with the first end of the optical conductor.

16. The assembly of claim 15 wherein the alignment structure comprises a first ferrule having at least a first face and the first face of the alignment structure is the first face of the ferrule.

17. The assembly of claim 16 additionally comprising index matching gel between the first face of the ferrule and the exposed end of the optical waveguide in the substrate.

18. The assembly of claim 16 wherein the first ferrule comprises a second face and the second face of the alignment structure is the second face of the ferrule.

19. The assembly of claim 16 wherein the alignment structure comprises a second ferrule with a face and the second face of the alignment structure is the face of the second ferrule.

20. The assembly of claim 15 additionally comprising an alignment body mounted to the substrate, and the alignment feature is formed on the alignment body.

21. The assembly of claim 15 wherein the alignment feature comprises a post.

22. The assembly of claim 15 wherein the substrate comprises a printed circuit board with electrically conductive traces formed therein.

23. The assembly of claim 21 additionally comprising an electrical connector mounted to the substrate.

24. The assembly of claim 15 wherein the substrate is generally planar, and comprises a second optical waveguide running in the plane and a reflective element coupling lich between the second optical waveguide and the waveguide exposed in the surface of the substrate.

25. The assembly of claim 15 additionally comprising a housing attached to the substrate, the housing having a cavity with the second face of the alignment positioned exposed within the cavity.

* * * * *

UNITED STATES PATENT AND TRADEMARK OFFICE
CERTIFICATE OF CORRECTION

Page 1 of 1

PATENT NO. : 7,561,763 B2
APPLICATION NO. : 11/785627
DATED : July 14, 2009
INVENTOR(S) : Kiani et al.

It is certified that error appears in the above-identified patent and that said Letters Patent is hereby corrected as shown below:

At Col. 1, line 4, please insert --This application is a divisional of U.S. Patent Application No. 10/881,248, filed June 30, 2005, now U.S. Patent No. 7,213,974.--

Signed and Sealed this
Twenty-eighth Day of June, 2011

David J. Kappos
*Director of the United States Patent and Trademark Office*